Patented Dec. 19, 1950

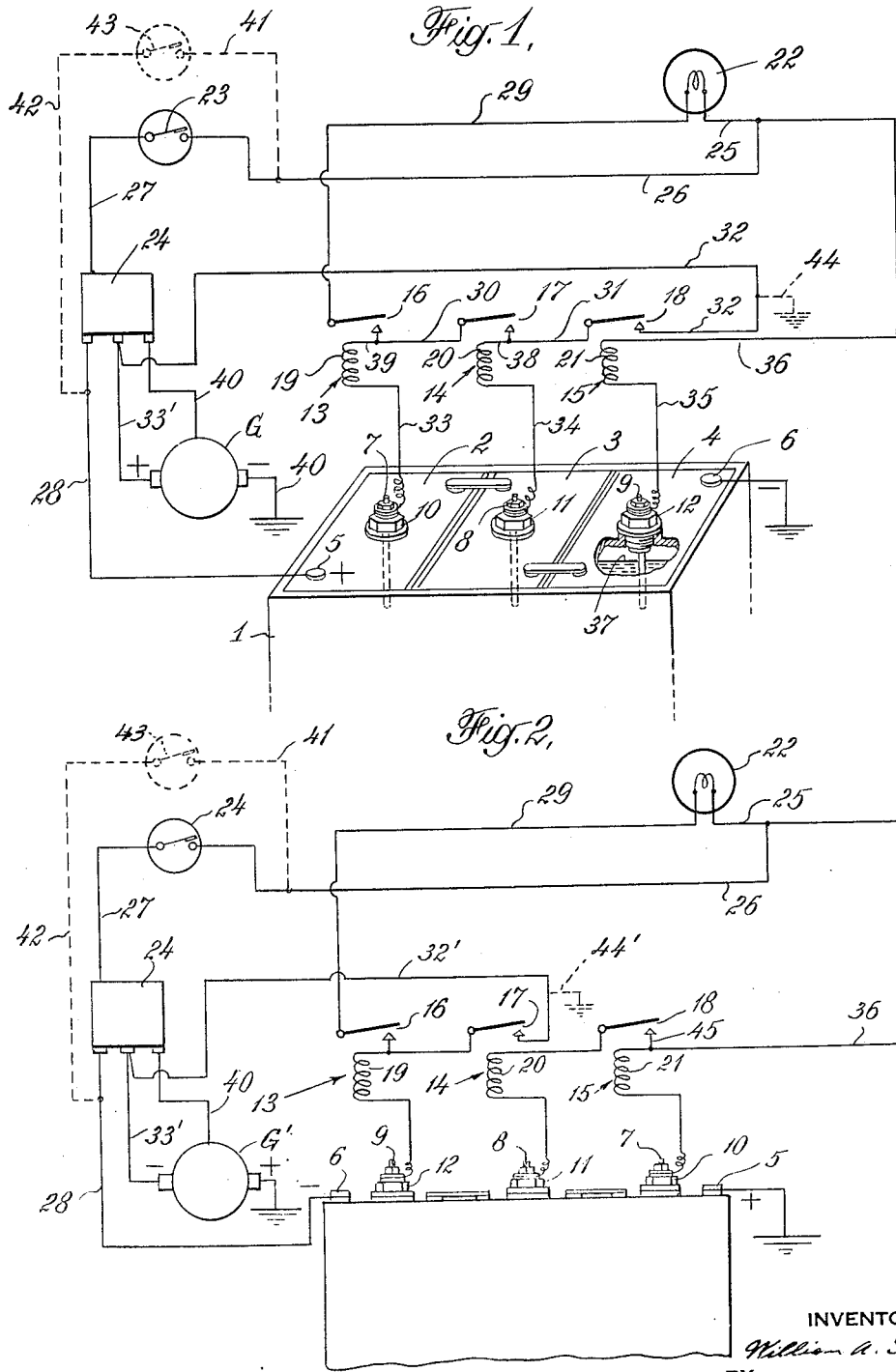

2,534,633

UNITED STATES PATENT OFFICE 2,534,633

BATTERY ELECTROLYTE LEVEL INDICATOR

William A. Smith, Cedar Rapids, Iowa

Application September 8, 1948, Serial No. 48,293

6 Claims. (Cl. 177—311)

1

This invention relates to testing apparatus for storage batteries and more particularly to apparatus for determining whether the level of the electrolyte in the storage battery cells is as high as it should be for satisfactory normal operation of the battery.

A particular object of this invention is to provide battery testing apparatus including a signal lamp or other signal device connected in circuit with battery electrodes and relays in such a manner that the signal device will fail to operate whenever the level of the electrolyte in any one of the battery cells is below the desired predetermined value. Such a system provides an adequate indication of the condition of the battery because if the level of the electrolyte in any one cell is below normal, the battery needs attention and water may be added to such cells as require it.

A further object of the invention is to provide a system of the type described above including a single operating switch and a single signal device connected and arranged so that the signal device provides an indication of an abnormally low electrolyte level in any one of the battery cells.

A further object of the invention is to provide a battery testing apparatus of the type described above so associated with the ignition generator of the usual automobile or other battery installation wherein the generator is connected to charge the battery, that the ignition switch upon closing, causes the electrolyte level indicating device to provide the desired indication of the condition of the battery and so that operation of the generator, after the ignition circuit has been closed, deenergizes a control relay to thereby deenergize the signal lamp or other signal device. Thus, according to this embodiment of my invention, the ignition switch may serve to provide the desired indication, through the liquid level indicator, of the condition of the battery whenever the ignition switch is turned on and promptly thereafter, when the generator voltage builds up, the indicating or signal device is automatically deenergized.

The various objects and advantages of this invention will be more apparent upon considering the following detailed description of typical embodiments thereof illustrated in the accompanying drawings in which:

Fig. 1 is a diagrammatic illustration of battery testing apparatus embodying my invention; and Fig. 2 is a diagrammatic illustration of battery testing apparatus similar to that shown in Fig. 1

2 except that in Fig. 2 the positive terminal of the battery is grounded whereas in Fig. 1 the negative terminal of the battery is grounded.

In Fig. 1 I have illustrated in diagrammatic form an ordinary storage battery 1 having a number of individual cells 2, 3, 4 connected in series in the usual manner, the battery having binding posts or terminals 5 and 6. The battery cells have the usual filling openings in the tops thereof normally closed by plugs or caps 10, 11 and 12.

In accordance with this invention it is contemplated that each battery cap or plug such as those illustrated at 9, 10 and 11 in the accompanying drawings shall have mounted therein electrodes 7, 8 and 9 projecting down through the caps and depending into the upper portion of the battery so that each electrode will make contact with the electrolyte in the corresponding cell, provided the level of this electrolyte is high enough. If the electrolyte is below the desired predetermined value, then the electrode does not touch the electrolyte. A relay is provided for each cell of the battery. Thus in Fig. 1, a relay 13 is provided for cell 2, a relay 14 for cell 3 and a relay 15 for cell 4. The relays 13, 14 and 15 have relay contacts 16, 17 and 18, respectively, and magnetizing coils 19, 20 and 21, respectively.

My improved testing apparatus includes a current indicating device of any desired type such as the incandescent lamp 22. The system as illustrated in full lines in Fig. 1 includes a portion of the ignition system of an internal combustion engine (not shown) such as the engine of an automobile. Thus the switch 23 may be the ignition switch of an automobile ignition system including the usual generator G and voltage regulator 24. The battery 1 has a positive terminal 5 and a negative terminal or binding post 6. In this system of Fig. 1, the negative terminal 6 of the battery is grounded and the negative terminal of the armature of generator G is likewise grounded. The current indicating device or signal lamp 22 is connected to the positive terminal 5 of the battery through the ignition switch 23 and the voltage regulator 24, this circuit being as follows: Wire 25, wire 26, ignition switch 23, wire 27 to the voltage regulator and wire 28 leading from the voltage regulator to the terminal 5. The other terminal of the signal lamp 22 is connected to one of the contacts 16 of relay 13 by a wire 29. The other contact of the relay 13 is connected to one of the contacts 17 of relay 14 through wire 30. In a like manner the other contact of relay 14 is connected to one of the contacts 18 of relay 15 by a wire 31.

The other contact of relay 15 is connected to the positive terminal of the generator armature through wires 32 and 33'. Circuit connections are provided between the operating coils of relays 13, 14 and 15 and the electrodes 7, 8 and 9 of the corresponding cells 2, 3 and 4 of the battery 1. Thus coil 19 of relay 13 is connected to electrode 7 by wire 33, coil 20 of relay 14 is connected to electrode 8 by a wire 34 and coil 21 of relay 15 is connected to electrode 9 by a wire 35. The other terminal of coil 21 of relay 15 is connected to the positive terminal 5 of battery 1 through wires 36, 26, ignition switch 23, wire 27, voltage regulator 24 and wire 28.

The operation of this portion of the system of Fig. 1 described above is as follows:

Upon closing the ignition switch 23, a circuit is completed through the operating coil 21 of relay 15, if the level of electrolyte in cell 4 is high enough to make electrical contact with the electrode 9 carried by the filling cap of this cell, this circuit being as follows: positive terminals 5 of the battery, wire 28, voltage regulator 24, wire 27, ignition switch 23, wire 26, wire 36, coil 21 of relay 15, wire 35 and electrode 9 projecting downward into the electrolyte 37 of cell 4. The potential difference between the positive terminal 5 and the electrode 9 is sufficient to cause enough current to flow through the coil 21 of relay 15 to energize the relay and close its contacts 18. One of these contacts 18 is connected to the generator armature through wires 32 and 33' as explained above and the other contact is connected to one of the contacts 17 of relay 14 and with the operating coil 20 of this relay through wires 31 and 38. Accordingly, as soon as contacts 18 close, the relay coil 20 of relay 14 is energized, provided the level of the electrolyte in cell 3 is high enough to make electrical contact with the electrode 8 projecting down into this cell through the cap 11. The circuit for this relay coil comprises the electrode 8, wire 34, coil 20, wires 38 and 31, contacts 18, wires 32 and 33', the armature of the generator G and the grounded negative terminal of this generator armature as shown at 40. Thus, if the level of the electrolyte in cell 3 is adequate to make contact with the electrode 8, the coil 20 is supplied with current because the potential difference between the electrode 8 and the grounded connection 40 of the generator is sufficient to energize the relay coil and close the relay contacts 17 of relay 14.

When these contacts of relay 14 close, current is then supplied to coil 19 of relay 13 provided the level of the electrolyte in cell 2 is high enough to make electrical contact with the electrode 7 projecting downward into this cell through the cap 10. The circuit for this coil 19 includes electrode 7, wire 33, coil 19, wires 39 and 30, contacts 17 of relay 14, wire 31, contacts 18 of relay 15, wires 32 and 33', the generator armature and the ground connection 40. The potential difference between the ground connection and electrode 7 is sufficient to energize the coil 19 of relay 13 and this relay then closes its contacts 16 to complete the energizing circuit for the signal device 22. The signal lamp 22 is now connected to a source of current because this lamp is now connected in circuit between the positive terminal 5 of the battery 1 and the ground connection 40, this circuit comprising battery terminal 5, wire 28, voltage regulator 24, wire 27, ignition switch 23, wires 26 and 25, lamp 22, wire 29, relay contacts 16, wire 30, relay contacts 17, wire 31, relay contacts 18, wires 32 and 33', the armature of generator G and the ground connection 40.

Thus if the electrodes 7, 8 and 9 have made electrical contact with the electrolyte in cells 2, 3 and 4, respectively, the closing of the switch 23 causes relays 15, 14 and 13 to be energized one after the other, to complete the circuit for the current indicator 22. If the level of the electrolyte in any one of the cells is below the desired predetermined value, the signal device 22 will not be energized and this makes it apparent that the battery needs attention. In the system of Fig. 1, the contacts of relays 13, 14 and 15 are all connected in series and if the electrolyte in cell 4 is abnormally low, relay 15 will not be energized to close its contacts and accordingly relays 14 and 13 will not be energized even though electrolyte in cells 2 and 3 makes contact with electrodes 7 and 8. Similarly if the electrolyte in cell 3 is below the desired value and the electrolyte in the other cells is high enough to make contact with the electrode therein, relay 14 will not be energized and this prevents relay 13 from being energized. Also if cell 2 is the only cell in which the electrolyte is below the desired value, relay 13 will not be energized even though relays 13 and 14 are energized and this prevents the lamp circuit from being completed because contacts 16 of relay 13 remain open.

A particular feature of the system described above and shown in Fig. 1 is the connection of one of the relay operating coils to the ignition circuit in such a manner that after the ignition switch 23 has been closed to cause the signal device 22 to be energized as described above, the starting of the engine to drive generator G will automatically disconnect the signal device from its source of current. In the arrangement shown in Fig. 1, this result is obtained by virtue of the fact that the coil 20 of relay 14 derives its current through a circuit including the generator armature and when the generator is at rest, the potential difference between the electrode 8 and the grounded terminal of the generator, as shown at 40, is sufficient to energize the relay coil 20. As soon as the generator is in operation, however, the voltage generated therein builds up to a value such that the positive terminal of the generator armature has the same potential as electrode 8 connected to relay coil 20, thus deenergizing this coil and causing it to open the contacts 17. This interrupts the flow of current to the current indicating device 22 and accordingly this device is automatically disconnected from its source of current as soon as the generator voltage increases to such a value as to deenergize the coil 20 of relay 14.

As explained above, the system shown in full lines in Fig. 1 includes portions of the ignition system such as the ignition system of an automobile, such portions being the generator G, the voltage regulator 24, the generator armature being connected with the voltage regulator through wire 33' and the generator field winding being connected to the voltage regulator by a wire 40, with the voltage regulator connected to the ignition switch 23 by a wire 27. It will be understood, however, that my improved testing apparatus system may be associated with the ignition system as above described or, if desired, the liquid level testing apparatus may be used independently of the ignition system. This latter arrangement is indicated by the dotted lines in Fig. 1 which show the wire 26 connected directly to wire 28 leading to the positive terminal 5 of the battery, through wires 41 and 42 connected to manually operated switch 43, and in this embodiment of the invention, one of the contacts 18 of the relay 15 is connected to ground as shown at 44 instead of being connected to the voltage regulator 24.

In this modified arrangement, the closing of the switch 43 energizes relay 15, the circuit being as follows: positive terminal 5, wires 28 and 42, switch 43, wire 41, wires 26 and 36, coil 21, wire 35 and electrode 9. The closing of relay contacts 18 completes the circuit for the coil of relay 14 from electrode 8 through wire 34, coil 20, wires 38 and 31, relay contacts 18 and ground connection 44. The closing of relay contacts 17 then energizes relay 13 in the manner described above and as soon as the contacts 16 of relay 13 close, current is supplied to the signal lamp 22, the circuit comprising the positive terminal 5, wires 28 and 42, switch 43, wires 41, 26 and 25, lamp 22, wire 29, relay contacts 16, wire 30, relay contacts 17, wire 31, relay contacts 18, wire 32 and ground connection 44. In this form of the invention as in the embodiment first described in detail, the failure of any one of the electrodes 7, 8 and 9 to make contact with the electrolyte in the corresponding cell prevents the completion of the circuit for the corresponding relay and this prevents current from being supplied to the current indicator 22.

The embodiment of my invention illustrated in Fig. 2 is the same in all respects as that illustrated in Fig. 1 except that in Fig. 2 the generator G' and the positive terminal 5 of the battery are grounded; one of the contacts 18 of the relay 15 is connected to wire 36 by a wire 45; and one of the contacts 17 of relay 14 is connected to the voltage regulator 24 by wire 32'. In this system of Fig. 2 the closing of ignition switch 24 serves to energize the relay 15, current being supplied to the magnetizing coil 21 of this relay because of the potential difference between the electrode 7 and the negative terminal 6 of the battery. The closing of the relay 15 serves to complete the circuit for relay 14 as described above in connection with Fig. 1 and when relay 14 is energized current is then supplied to the magnetizing coil 19 of relay 13 which is now connected to the electrode 9 and the ground connection of the generator G'.

The system of Fig. 2 operates in the manner described above in connection with Fig. 1 and accordingly if the level of the electrolyte in any battery cell is too low to make contact with the electrode therein, the corresponding relay is not energized and the signal lamp circuit remains unenergized, thus indicating that the battery needs attention. If all relays are energized by virtue of the fact that the electrolyte makes contact with the electrode in each cell, then the signal lamp 22 remains energized until the generator voltage builds up to a point where it neutralizes the potential across the magnetizing coil 19 of relay 13, causing this relay to open its contacts and disconnect the indicating device 22 from its source of current.

It is to be understood that my invention is not limited to the specific embodiments illustrated in the accompanying drawings but may be modified within the scope of the appended claims.

I claim:

1. An electrolyte level indicator for storage batteries comprising a relay for each cell of the battery each relay having contacts and an operating coil, an electrode for each cell, mounted to project into the cell to make electrical contact with the electrolyte therein when the lever thereof is above a predetermined value, a current indicator, a control switch, circuit connections for connecting each relay coil to the electrode of the corresponding cell, for connecting the control switch with a terminal of the battery and with the coil of one of said relays and for connecting the coil of each relay other than said one relay to a circuit terminal through the contacts of another relay, whereby each relay is energized upon closing the control switch when the level of the electrolyte is above said predetermined value, and circuit connections interconnecting contacts of said relays and connecting the indicator to a source of current through the interconnected relay contacts to supply current to the indicator when all of the relays are energized.

2. An electrolyte level indicator for storage batteries comprising a relay for each cell of the battery, each relay having contacts and an operating coil, an electrode for each cell mounted to project into the cell to make electrical contact with the electrolyte therein when the level of the electrolyte therein is above a predetermined value, a current indicator, a control switch, circuit connections for connecting each relay coil to the electrode of the corresponding cell, for connecting the control switch with a terminal of the battery and with the coil of one of said relays and for connecting the coil of each relay other than said one relay to a circuit terminal through the contacts of another relay whereby each relay is energized upon closing the control switch when the level of the electrolyte is above said predetermined level, and circuit connections connecting the contacts of said relays in series with each other and with the current indicator, and to a source of current whereby current is supplied to the indicator when all of the relays are energized.

3. The combination with the ignition switch, generator and storage battery of an ignition system, a relay for each cell of the battery, each relay having contacts and an operating coil, of an electrode for each cell of the battery, means for mounting each electrode to project into the cell to make electrical contact with the electrolyte therein when the level thereof is above a predetermined value, a current indicator, circuit connections for connecting each relay coil to the electrode of the corresponding cell, for connecting the ignition switch with a terminal of the battery and with the coil of one of said relays, and for connecting the coil of each relay other than said one relay to a circuit terminal through the contacts of another relay whereby each relay is energized upon closing the ignition switch when the level of the electrolyte is above said predetermined value, and circuit connections interconnecting contacts of said relays and connecting the indicator to a source of current through the interconnected relay contacts to supply current to the indicator when all of the relays are energized.

4. The combination with the ignition switch, generator and storage battery of an ignition system, a relay for each cell of the battery, each relay having contacts and an operating coil, of an electrode for each cell of the battery, means for mounting each electrode to project into the cell to make electrical contact with the electrolyte therein when the level of the electrolyte thereof is above a predetermined value, a current indicator, circuit connections for connecting each relay coil to the electrode of the corresponding cell, for connecting the ignition switch with a terminal of the battery and with the coil of one of said relays and for connecting the coil of each relay other than said one relay to a circuit terminal through the contacts of another relay whereby each relay is energized upon closing the ignition switch when the level of electrolyte is above said predetermined value, and circuit connections connecting the contacts of said relays in series with each other and with the current indicator, and to a source of current whereby current is supplied to the indicator when all of the relays are energized.

5. The combination with the ignition switch, generator and storage battery of an ignition system, a relay for each cell of the battery, each relay having contacts and an operating coil of, an electrode for each cell of the battery, means for mounting each electrode to project into the cell to make electrical contact with the electrolyte therein when the level thereof is above a predetermined value, a current indicator, circuit connections for connecting each relay coil to the electrode of the corresponding cell, for connecting the ignition switch with a terminal of the battery and with the coil of one of said relays and for connecting the coil of each relay other than said one relay to a circuit terminal through the contacts of another relay whereby each relay is energized upon closing the ignition switch when the level of the electrolyte is above said predetermined value, and circuit connections interconnecting contacts of said relays and connecting the indicator to a source of current through the interconnected relay contacts to supply current to the indicator when all of the relays are energized, the coil of one of said relays being connected to the generator armature whereby operation of the generator deenergizes this relay, thereby disconnecting said indicator from said source of current.

6. The combination with the ignition switch, generator and storage battery of an ignition system, a relay for each cell of the battery, each relay having contacts and an operating coil of an electrode for each cell of the battery, means for mounting each electrode to project into the cell to make electrical contact with the electrolyte therein when the level of the electrolyte thereof is above a predetermined value, a current indicator, circuit connections for connecting each relay coil to the electrode of the corresponding cell, for connecting the ignition switch with a terminal of the battery and with the coil of one of said relays and for connecting the coil of each relay other than said one relay to a circuit terminal through the contacts of another relay whereby each relay is energized upon closing the ignition switch when the level of electrolyte is above said predetermined value, and circuit connections connecting the contacts of said relays in series with each other and with the current indicator, and to a source of current whereby current is supplied to the indicator when all of the relays are energized, the coil of one of said relays being connected to the generator armature whereby operation of the generator deenergizes this relay, thereby disconnecting said indicator from said source of current.

WILLIAM A. SMITH.

REFERENCES CITED

The following references are of record in the file of this patent:

UNITED STATES PATENTS

| Number | Name | Date |
|---|---|---|
| 482,148 | Badt | Sept. 6, 1892 |
| 1,434,728 | Arendt et al | Nov. 7, 1922 |
| 1,818,185 | Yull | Aug. 11, 1931 |
| 2,064,460 | Carr et al | Dec. 15, 1936 |